(12) United States Patent
Choi et al.

(10) Patent No.: US 6,292,296 B1
(45) Date of Patent: Sep. 18, 2001

(54) LARGE SCALE POLARIZER AND POLARIZER SYSTEM EMPLOYING IT

(75) Inventors: Jae Beom Choi, Seoul; Byung Duck Song, Kyungki-do; Ki Hyuk Yoon, Seoul, all of (KR)

(73) Assignee: LG. Philips LCD Co., Ltd., Seoul (KR)

( * ) Notice: Subject to any disclaimer, the term of this patent is extended or adjusted under 35 U.S.C. 154(b) by 65 days.

(21) Appl. No.: 09/084,583

(22) Filed: May 27, 1998

(30) Foreign Application Priority Data

May 28, 1997 (KR) .................................. 97-21140
Sep. 30, 1997 (KR) .................................. 97-50498

(51) Int. Cl.[7] .................................................. G02B 5/30
(52) U.S. Cl. ..................... 359/487; 359/352; 359/488; 349/124
(58) Field of Search ................. 359/352, 483, 359/485, 487, 488; 349/154

(56) References Cited

U.S. PATENT DOCUMENTS

| | | | |
|---|---|---|---|
| 2,810,324 | * 10/1957 | Marks | 359/488 |
| 3,912,920 | * 10/1975 | Kubota | 359/487 |
| 4,963,448 | 10/1990 | Ichimura et al. | 430/20 |
| 4,974,941 | 12/1990 | Gibbons et al. | |
| 5,032,009 | 7/1991 | Gibbons et al. | |
| 5,073,294 | 12/1991 | Shannon et al. | |
| 5,296,321 | 3/1994 | Kawanishi et al. | |
| 5,389,698 | 2/1995 | Chigrinov et al. | |

(List continued on next page.)

FOREIGN PATENT DOCUMENTS

| | | |
|---|---|---|
| 44 20 585 | 12/1995 | (DE) . |
| 197 03 682 | 8/1997 | (DE) . |
| 0 261 712 A1 | 3/1988 | (EP) . |
| 0 525 473 | 2/1993 | (EP) . |
| 0 525 478 | 2/1993 | (EP) . |

(List continued on next page.)

OTHER PUBLICATIONS

Hecht, 'Optics', Addison–Wesley Publishing Co., 2nd Edition, pp. 298–299, 1987.*

Jenkins, Francis A., Harvey E. White, Fundamentals of Optics, 3rd edition, pp. 492–493., 1957.

Jpn J Appl Phys., vol. 35 (1996), Part 2, No. 10A, Oct. 1, 1996, "Tilting of Liquid Crystal through Interaction with Methyl Orange Molecules Oriented by Circularly Polarized Light," by Tong Kun Lim, Sang Un Choi, Sang Don Lee and Young Il Park, Department of Physics, Korea University, Seoul, Korea, pp: 1281–1283.

W. Gibbons, et al., Surface–mediated alignment of nematic liquid crystals with polarized laser light, Letters to Nature, vol. 351, May 2, 1991, pp. 49 & 50.

Martin Schadt, Surface–Induced Parallel Alignment of Liquid Crystals by Linearly Polymerized Photopolymers, Jpn. J. Appl. Phys. vol. 31 (1992), Part 1, No. 7, Jul. 1992.

Yasufumi Iimura, et al., Alighment Control of a Liquid Crysal on a Photosensitive Polyvinylalcohol Film, Jpn. J. Appln. Phys. vol. 32 (1993), Part 2, No. 1A/B, Jan. 15, 1993.

(List continued on next page.)

Primary Examiner—Darren Schuberg
(74) Attorney, Agent, or Firm—Long Aldridge & Norman, LLP

(57) ABSTRACT

A large scale polarizer comprises one or more quartz substrate parts formed as a rectangle, a triangle, or a parallelogram, and a polarizer holder supporting the quartz substrate part. The polarizer holder may be in a lattice structure holding a plurality of quartz substrate parts. A polarizer system employing the large scale polarizer comprises a, lens making an incident light to a parallel light, the large scale polarizer, and a moving control part coupled to and moving the large scale polarizer.

27 Claims, 7 Drawing Sheets

U.S. PATENT DOCUMENTS

| | | |
|---|---|---|
| 5,447,662 | 9/1995 | Herr et al. . |
| 5,453,862 | 9/1995 | Toko et al. . |
| 5,464,669 | 11/1995 | Kang et al. . |
| 5,479,282 | 12/1995 | Toko et al. . |
| 5,538,823 | 7/1996 | Park et al. . |
| 5,539,074 | 7/1996 | Herr et al. . |
| 5,576,862 | 11/1996 | Sugiyama et al. . |
| 5,578,351 | 11/1996 | Shashidhar et al. . |
| 5,602,661 | 2/1997 | Schadt et al. . |
| 5,604,615 | 2/1997 | Iwagoe et al. . |
| 5,657,105 | 8/1997 | McCartney . |
| 5,705,096 | 1/1998 | Kano et al. ............... 252/299.4 |
| 5,712,696 | 1/1998 | Toko et al. . |
| 5,764,326 | 6/1998 | Hasegawa et al. . |
| 5,767,994 | 6/1998 | Kang et al. . |
| 5,784,139 | 7/1998 | Chigrinov et al. . |
| 5,786,041 | 7/1998 | Takenaka et al. ............... 428/1 |
| 5,824,377 | 10/1998 | Pirwitz et al. . |
| 5,853,818 | 12/1998 | Kwon et al. . |
| 5,856,430 | 1/1999 | Gibbons et al. ............... 528/353 |
| 5,856,431 | 1/1999 | Gibbons et al. ............... 528/353 |
| 5,859,682 | 1/1999 | Kim et al. . |
| 5,880,803 | 3/1999 | Tamai et al. ............... 349/156 |
| 5,882,238 | 3/1999 | Kim et al. . |
| 5,889,571 | * 3/1999 | Kim et al. ............... 349/124 |
| 5,909,265 | 6/1999 | Kim et al. . |
| 5,928,561 | 7/1999 | Bryan-Brown et al. ........ 252/299.4 |
| 5,934,780 | 8/1999 | Tanaka ............... 362/19 |
| 5,982,466 | 11/1999 | Choi et al. . |

FOREIGN PATENT DOCUMENTS

| | | |
|---|---|---|
| 0 549 283 A2 | 6/1993 | (EP) . |
| 0 635 748 A1 | 1/1995 | (EP) . |
| 0 708 354 | 4/1996 | (EP) . |
| 0 611 786 | 7/1996 | (EP) . |
| 0 742 471 | 11/1996 | (EP) . |
| 0 750 212 | 12/1996 | (EP) . |
| 0 788 012 A2 | 8/1997 | (EP) . |
| 2 281 977 | 3/1995 | (GB) . |
| 2 286 893 | 8/1995 | (GB) . |
| 2 309 793 | 8/1997 | (GB) . |
| 2 309 794 | 8/1997 | (GB) . |
| 2 310 048 | 8/1997 | (GB) . |
| 2 317 964 A1 | 4/1998 | (GB) . |
| 2 319 093 | 5/1998 | (GB) . |
| 64-60833 | 3/1989 | (JP) . |
| 1-251344 | 10/1989 | (JP) . |
| 1-251345 | 10/1989 | (JP) . |
| 2-55330 | 2/1990 | (JP) . |
| 2-298917 | 12/1990 | (JP) . |
| 3-36527 | 2/1991 | (JP) . |
| 3-120503 | 5/1991 | (JP) . |
| 3-241311 | 10/1991 | (JP) . |
| 04-7520 | 1/1992 | (JP) . |
| 4-284421 | 10/1992 | (JP) . |
| 4-350822 | 12/1992 | (JP) . |
| 5-19208 | 1/1993 | (JP) . |
| 5-34699 | 2/1993 | (JP) . |
| 5-53513 | 3/1993 | (JP) . |
| 5-232473 | 9/1993 | (JP) . |
| 7-56173 | 3/1995 | (JP) . |
| 7-261185 | 10/1995 | (JP) . |
| 07-318942 | 12/1995 | (JP) . |
| 7-318861 | 12/1995 | (JP) . |
| 8-334790 | 12/1996 | (JP) . |
| 09-211465 | 8/1997 | (JP) . |
| 9-211468 | 8/1997 | (JP) . |
| 09-265095 | 10/1997 | (JP) . |
| 09-318946 | 12/1997 | (JP) . |
| 10-90684 | 4/1998 | (JP) . |
| 10-154658 | 6/1998 | (JP) . |
| 10-161126 | 6/1998 | (JP) . |
| 10-332932 | 12/1998 | (JP) . |
| 11-194344 | 7/1999 | (JP) . |
| 11-194345 | 7/1999 | (JP) . |
| 024518 | 7/1998 | (KR) . |
| 169063 | 10/1998 | (KR) . |
| 94/28458 | 12/1994 | (WO) . |
| 95/18989 | 7/1995 | (WO) . |
| 95/22075 | 8/1995 | (WO) . |
| WO 95/34843 | 12/1995 | (WO) . |
| 96/22561 | 7/1996 | (WO) . |
| 99/08148 | 2/1999 | (WO) . |

OTHER PUBLICATIONS

Kunihiro Ichimura, Photocontrol of Liquid Crystal Alignment, 1993.

T. Marushii, et al., Photosensitive Orientants for Liquid Crystal Alignment, Mol. Mat. 1993, vol. 3, pp. 161–168.

Y. Toko, et al., TN–LCDs Fabricated by Non–Rubbing Showing Wide and Homogeneous Viewing Angular Characteristics and Excellent Voltage Holding Ratio, SID 93 Digest, pp. 622–625.

P. Shannon, et al., Patterned optical properties in photopolymerized surface–aligned liquid–crystal films, Letters to Nature, vol. 368, Apr. 7, 1994, pp. 532 & 533.

Y. Iimura, et al., Inveited Address: Electro–Optic Characteristics of Amorphous Super–Multidomain TN–LCDs Prepared by a Non–Rubbing Method, SID 94 Digest, pp. 915–918.

M. Schadt, et al., Photo–Generation of Linearly Polymerized Liquid Crystal Aligning Layers Comprising Novel, Integrated Optically Patterned Retarders and Color Filters, Jpn. J. Apply. Phys. vol. 34 (1995), pp. 3240–3249, Part 1, No. 6A, Jun. 1995.

A. Lien, et al., UV modification of surface pretilt of alignment layers of multidomain liquid crystal displays, Appl. Phys. Lett. 62 (21), Nov. 20, 1995, pp. 3108–3111.

M. Hasegawa, Nematic Homogeneous Photo Alignment by Polyimide Exposure to Linearly Polarized UV, Journal of Photopolymer Science and Technology, vol. 8, No. 2, 1995, pp. 241–248.

M. Schadt, Investigation of the Mechanism of the Surface-Induced Alignment of Liquid Crystals by Linearly Polymerized Photopolymers, SID 95 Digest, pp. 528–531.

J. West, et al., Polarized UV–Exposed Polyimide Films for Liquid–Crystal Alignment, SID 95 Digest, pp. 703–705.

T. Hashimoto, et al., TN–LCD with Quartered Subpixels Using Polarized UV–Light–Irradiated Polymer Orientation Films, SID 95 Digest, pp. 877–880.

T. Saitoh, et al., A New Hybrid N–TB Mode LCD with Two Domain Pixels Fabricated Using a Photopolymer, Asia Display 95, pp. 589–592.

A. Lien, UV–Type Two–Domain Wide Viewing Angle TFT/LCD Panels, Asia Display 95, pp. 593–596.

T. Yamamoto, Liquid–Crystal Alignment by Slantwise Irradiation of Non–Polarized UV Light on a Polyimide Layer, SID 96 Digest, pp. 642–645.

M. Schadt, et al., Optical patterning of multi–domain liquid–crystal displays with wide viewing angles, Letters to Nature, vol. 381, May 16, 1996.

J. Chen, Model of liquid crystal alignmnet by exposure to linearly polarized ultraviolet light, Physical Review E, vol. 54, No. 2, Aug. 1996, pp. 1599–1603.

H. Soh, et al., The Realization of Wide Viewing Angle TFT–LCDs using Photo–Alignment Method, Euro Display 96, pp. 579–582.

J. Chen, Mechanism of Liquid–Crystal Alignment by Polyimide Exposure to Linearly Polarized UV Light, SID 96 Digest, pp. 634–637.

K. Lee, et al., Late–News Poster: Mechanism of UV Modification of LC Pretilt Angle and Its Application to Two–Domain TN–LCDs, SID 96 Digest, pp. 638–641.

J. Kim, et al., Late–News Poster: Photo–Alignment of Liquid Crystals Using a New Photopolymer, SID 96 Digest, pp. 646–649.

Y. Saitoh, et al., Stability of UV–Type Two–Domain Wide-Viewing–Angle TFT–LCD Panels, SID 96 Digest, pp. 662–665.

D. Seo. et al., Invited Address: Surface Alignment of Liquid Crystals in LCDs, SID 93 Digest, pp. 954–956.

Y. Iimura, Invited Paper: Prospects of the Photo–Alignment Technique for LCD fabrication, SID 97 Digest, pp. 311–314.

R. Shashidhar, et al., A New Non–Rubbing Technique for Liquid Crystal Alignment, SID 97 Digest, pp. 315–318.

M. Schadt, et al., Invited Paper: Optical Patterning of Multidomain LCDs, SID 97 Digest, pp. 397–400.

K. Han, et al., A Study on the Photo–Alignment of the Polymer–Containing Cinnamate Group Using a New Single UV–Exposure Method, SID 97 Digest, pp. 707–710.

F. Yamada, et al., Late–News Poster: A New Photo–Alignment Scheme for LC–Cell Pretilt Control, SID 97 Digest, pp. 715–718.

M. Nam, et al., Wide–Viewing–Angle TFT–LCD with Photo–Aligned Four–Domain TN Mode, SID 97 Digest, pp. 933–936.

* cited by examiner

LARGE SCALE POLARIZER AND POLARIZER SYSTEM EMPLOYING IT

BACKGROUND OF THE INVENTION

A. Field of the Invention

The present invention relates to a polarizer and a polarizer system, and more particularly, to a large scale polarizer and a polarizer system employing the large scale polarizer.

B. Description of the Related Art

Generally, a liquid crystal display device (LCD) comprises upper and lower substrates placed to face each other with a specific interval farmed by a spacer, and a liquid crystal (LC) layer formed between the upper and lower substrates. The upper and lower substrates respectively have electrodes with specific patterns on their faced sides. And an alignment layer is formed over the electrodes to impart a pretilt angle on the LC.

For aligning the alignment layer, methods such as a rubbing method and a photo-alignment method have been proposed.

The rubbing method comprises depositing an alignment material, such as polyimide (PI), on a substrate and imparting the pretilt on the LC by rubbing the substrate with a rubbing cloth. Using this method, it is possible to make a large scale LCD and to align the alignment layer relatively quickly.

In the above described rubbing process, however, defects are generated by the microgrooves of the alignment layer which cause a light scattering and a random phase distortion. Moreover, dust particles and electrostatic discharge are produced in the alignment layer, so that a thin film transistor of the substrate is damaged and the yield is decreased.

On the other hand, the photo-alignment method imparts the pretilt on the LC by irradiating an ultraviolet light over a substrate having a photo-alignment layer. Compared with the rubbing method, there is no electrostatic discharge or dust particles, and thus the low yield problem is obviated. Moreover, it could control simultaneously the pretilt throughout the alignment layer, and this uniformly arranges the LC molecules. Therefore, there are several advantages, including preventing the random phase distortion or the light scattering from defects generated by the microgrooves.

At this time, to obtain a linearly or a partially polarized ultraviolet light, a polarizer polarizing an incident light from a light source is used. Particularly, the polarizer used in the photo-alignment process require that it be possible to apply in large scale, to use in the ultraviolet light range, and to have high endurance, heat resistance and light-transmittance.

In the conventional polarizer, however, because it is small, it is difficult to apply the polarizer to the photo-alignment process of a large scale LCD. In the case of the polarizer having an absorption mode on which polymers are deposited, the endurance and heat resistance properties are poor, and the wavelength of incident light is limited.

SUMMARY OF THE INVENTION

Accordingly, an object of the present invention is to provide a large scale polarizer with uniformity of the illuminance thereof, for use in a photo-alignment process during fabrication of a large scale LCD.

It is another object of the present invention to provide a polarizer system employing the large scale polarizer having a simplified process and driving system of the polarizer.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the large scale polarizer of the present invention comprises: a plurality of quartz substrate parts, each quartz substrate part including one or more quartz substrates; and a polarizer holder supporting said plurality of quartz substrate parts.

In another aspect of the invention, the polarizer system employing the large scale polarizer of the present invention comprises: a light source for generating a light; a plurality of quartz substrate parts, each quartz substrate part including one or more quartz substrates; a polarizer holder supporting said plurality of quartz substrate parts; and means for directing said light onto said plurality of quartz substrate parts.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION OF THE EMBODIMENT

Reference will now be made in detail to the present preferred embodiments of the invention, examples of which are illustrated in the accompanying drawings. Wherever possible, the same reference numbers will be used throughout the drawings to refer to the same or like parts.

Figure 1:
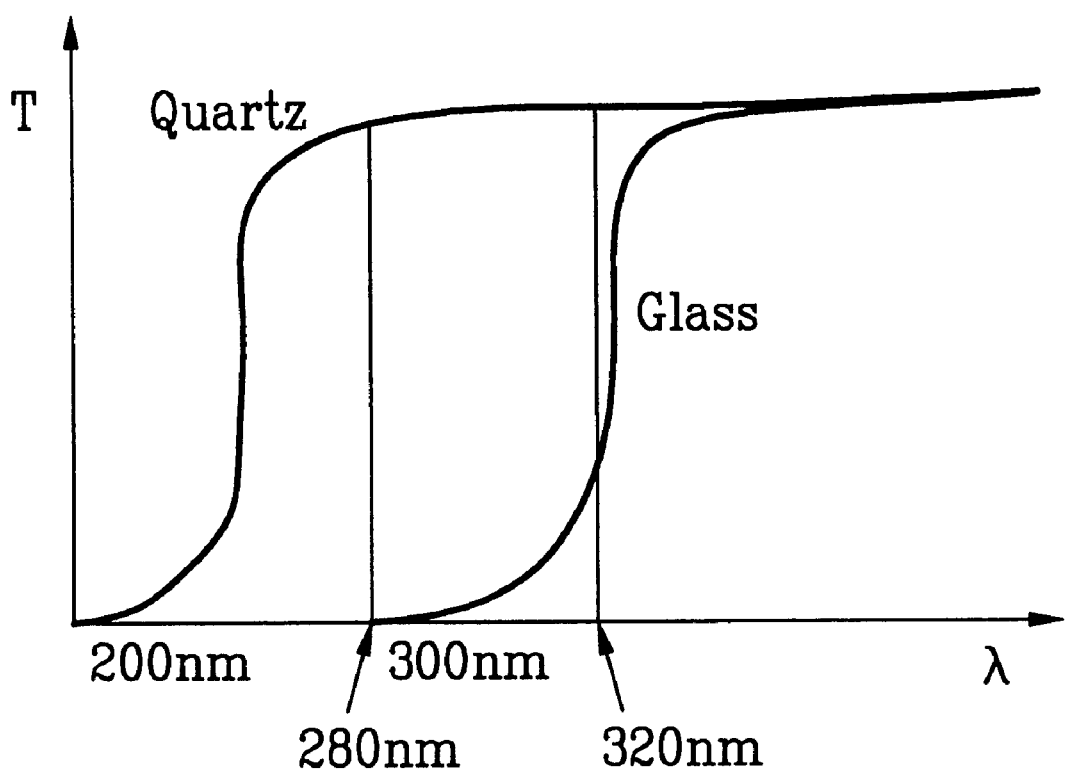
FIG. 1 is a graph showing a light transmittance characteristic of quartz and glass.

Generally, a light used in a photo-alignment process is an ultraviolet light, and more particularly, a light used as a polarized light is an ultraviolet light having a wavelength approximately between 280 nm and 320 nm. FIG. 1 is a graph showing a light transmittance characteristic of quartz and glass. As shown in the figure, from the light transmittance characteristics point of view, a quartz is more preferable than a glass.

Figure 2A:
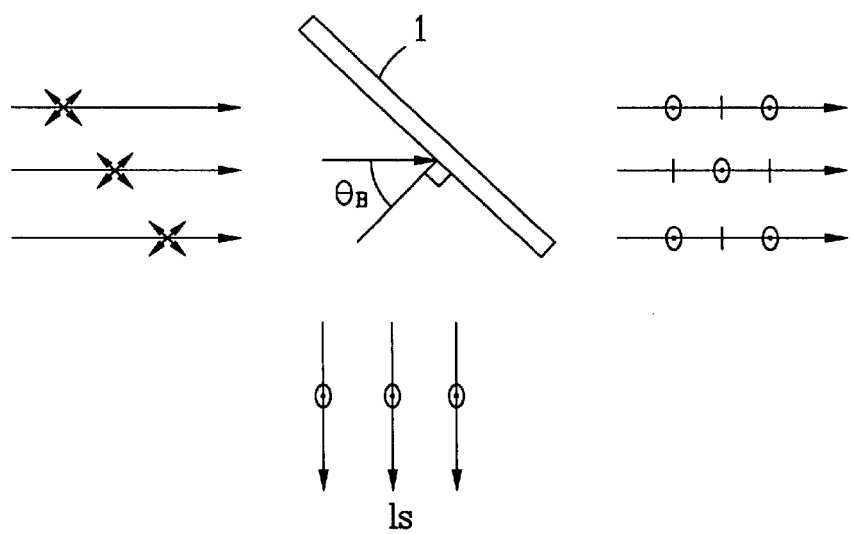
FIG. 2A shows polarization characteristics of a polarizer comprising one quartz substrate.
Figure 2B:
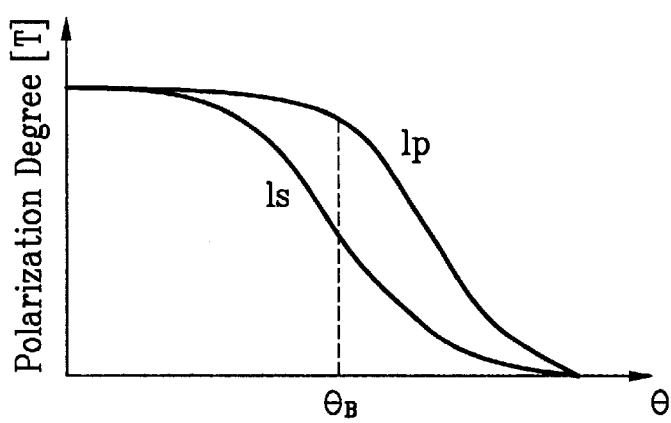
FIGS. 2B and 2C are graphs showing polarization characteristics of the polarizer shown in FIG. 2A.
Figure 2C:
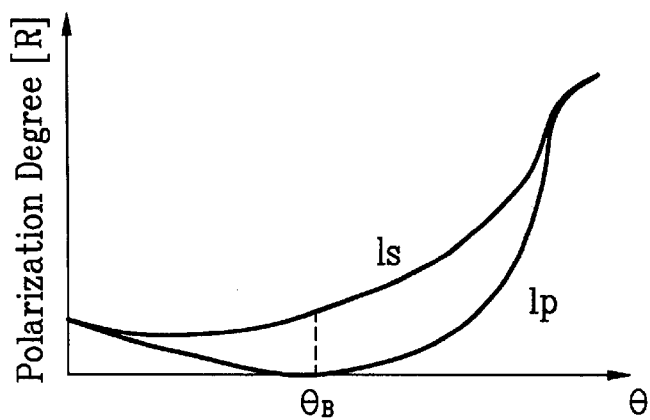

As shown in FIG. 2A, in the region irradiated by an unpolarized parallel light, a quartz substrate 1 is placed at the Brewster's angle $\theta_B$ with the incident light (that is, the normal of quartz substrate 1 and the incident light are at the Brewster's angle $\theta_B$). The light transmitted by quartz substrate 1 is a partially polarized light and the light reflected by quartz substrate 1 is a linearly polarized light. In FIG. 2A, the sign ⊙ indicates an S wave, that is, an S polarized light. $I_S$ represent the intensity of the S wave. The sign ↕ represents a P wave, that is, a P polarized light. In FIGS. 2B and 2C, $\theta$ is the angle between a normal line of quartz substrate 1 and the incident light.

The Brewster's angle $\theta_B$ is described as follows. If the unpolarized light is incident on the surface of quartz substrate 1 at the Brewster's angle, the reflected light is made linearly polarized with the electric vector transverse to the plane of incidence. The transmitted light is partially polarized.

FIG. 2B is a graph showing a polarization degree of the light transmitted by quartz substrate 1, and FIG. 2C is a graph showing a polarization degree of the light reflected by quartz substrate 1.

As shown in FIG. 2B, the light transmitted by quartz substrate 1 is a partially polarized light in which a P polarized light $I_P$ is greater than $I_S$ at the Brewster's angle $\theta_B$. Further, as shown in FIG. 2C, the light reflected by quartz substrate 1 is a linearly polarized light in which only an S polarized light $I_S$ exists at the Brewster's angle $\theta_B$.

Figure 3A:
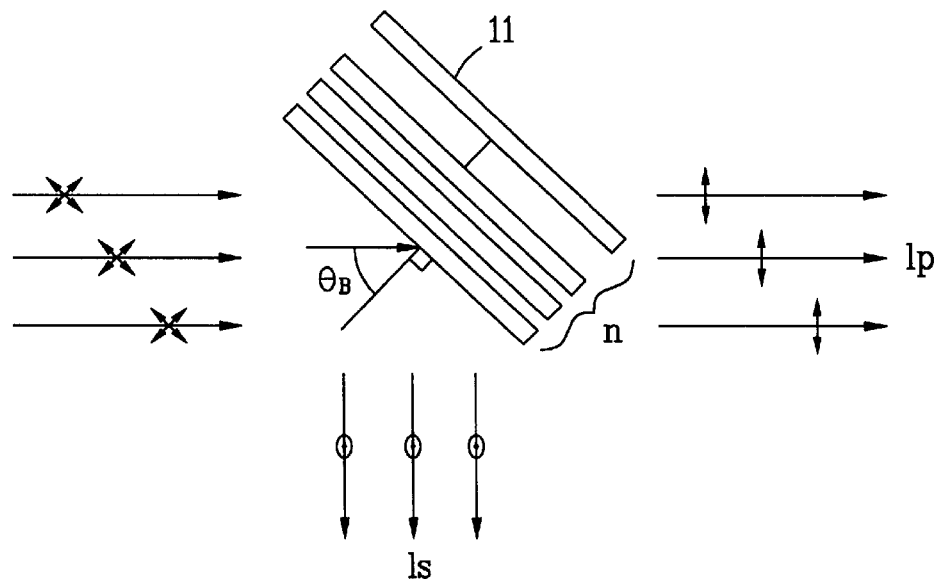
FIG. 3A shows polarization characteristics of a polarizer comprising two or more layers of quartz substrate.

On the other hand, as shown in FIG. 3A, in the region irradiated by an unpolarized parallel light, a layered quartz substrate 11, comprising one or more layers of quartz substrates, is placed to have the Brewster's angle $\theta_B$. All of the light transmitted and reflected by the layered quartz substrate 11 become linearly polarized. In FIG. 3A, the sign ↕ represents a P wave, that is, a P polarized light, and $I_P$ is the intensity of the P wave.

The sign ⊙ represents an S polarized light $I_S$ and $\theta$ is the an angle between a normal to the layered quartz substrate 11 and the incident light.

Figure 3B:
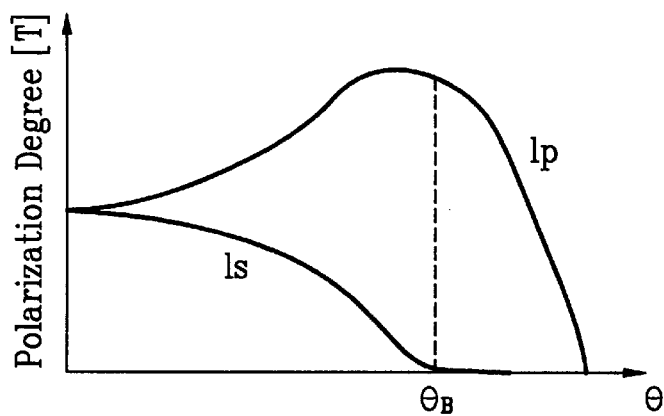
FIGS. 3B and 3C are graphs showing polarization characteristics of the polarizer shown in FIG. 3A.
Figure 3C:
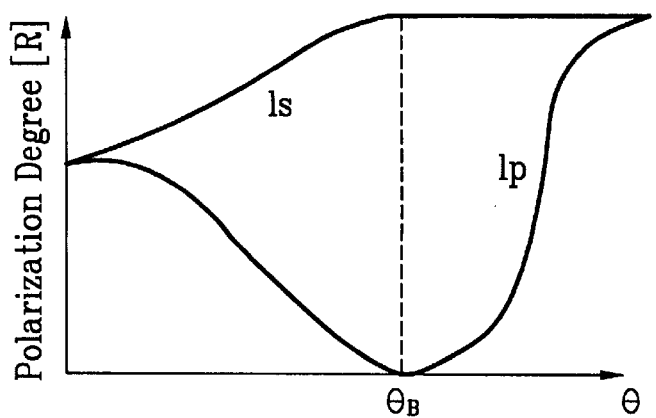

As shown in FIG. 3B, the light transmitted through layered quartz substrate 11 is a linearly polarized light in which only the P polarized light $I_P$ exists at the Brewster's angle $\theta_B$. Further, as shown in FIG. 3C, the light reflected by layered quartz substrate 11 is a linearly polarized light in which only the S polarized light $I_S$ exists at the Brewster's angle $\theta_B$.

As previously mentioned, when the number of the quartz substrates is over a specific number, the transmitted light becomes a linearly polarized light. Hence, it is possible to obtain a linearly or a partially polarized light easily by controlling the number of the quartz substrates.

Figure 4A:
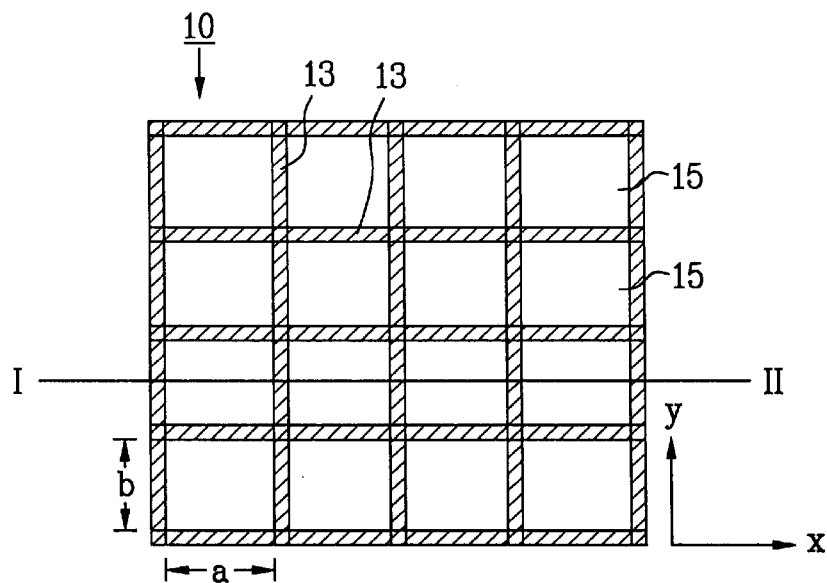
FIG. 4A is a plan view of a large scale polarizer according to an embodiment of the present invention.

FIG. 4A is a plan view of a large scale polarizer 10 according to an implementation of the present invention.

Large scale polarizer 10 comprises one or more quartz substrate parts 15 formed as a rectangle, and polarizer holders 13 formed as a lattice structure supporting quartz substrate part 15.

Each quartz substrate part 15 comprises one or more layers of quartz substrates, polarizes an incident light, and is positioned at the Brewster's angle against the incident light. Polarizer holder 13 includes an optically absorptive material. The marks a and b represent the interval between adjacent polarizer holders 13 in each X axis and Y axis.

Compared with the conventional polarizer, in the present large scale polarizer, a plurality of quartz substrate parts 15 are linked by polarizer holders 13 like a lattice structure, and it is possible to apply to a large scale LCD.

Figure 4B:
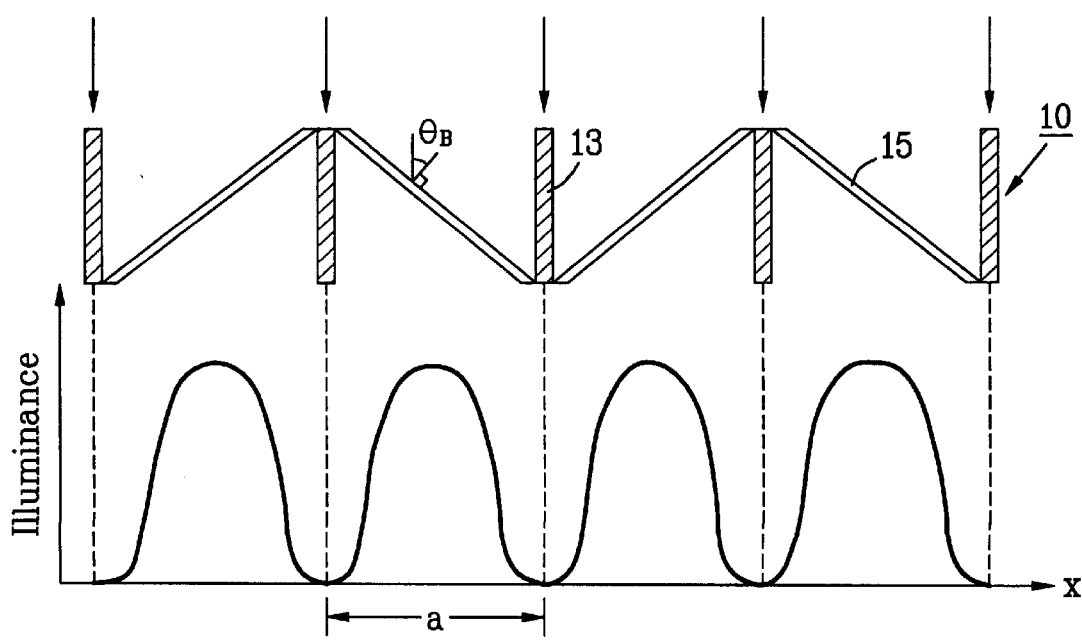
FIG. 4B is a graph showing a polarizing characteristic of the large scale polarizer shown in FIG. 4A.

FIG. 4B is a graph showing polarizing characteristics of the large scale polarizer shown in FIG. 4A, and shows also a sectional view taken along the line I–II of the large scale polarizer.

As shown in FIG. 4B, quartz substrate part 15 is formed between each polarizer holder 13 to have a Brewster's angle $\theta_B$ against the unpolarized incident parallel light. Thus, the incident light is normal to the surface of polarizer holder 13 and hence, quartz substrate part 15 forms the Brewster's angle relative to the normal to the surface of polarizer holder 13.

Figure 5A:
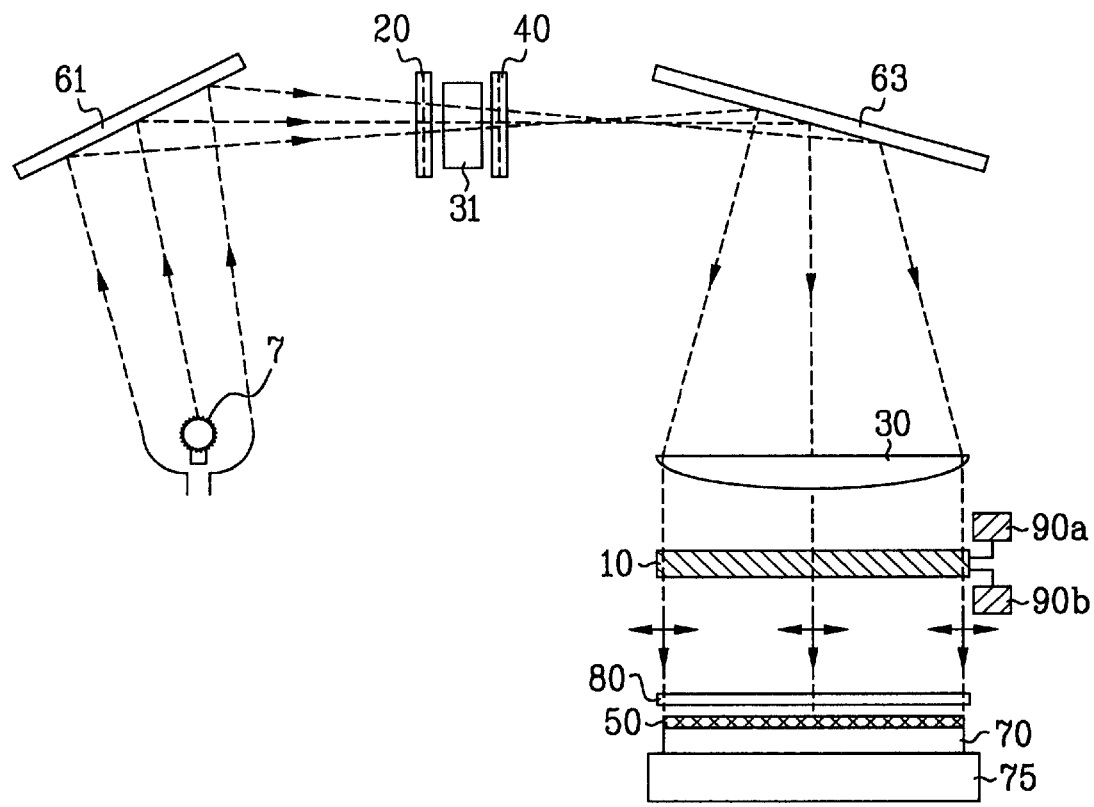
FIG. 5A shows a polarizer system employing the large scale polarizer shown in FIG. 4A.

Among the unpolarized incident parallel lights of incidence, the light reflected by quartz substrate part 15 is absorbed by polarizer holder 13, and the light transmitted by quartz substrate part 15 is irradiated over an alignment layer 50 (see FIG. 5A). At this time, polarizer holder 13 includes an optically absorptive material, and preferably includes a material whose optical absorptivity is almost 100%.

In large scale polarizer 10, the polarization degree needed is obtained by controlling the number of layers of the quartz substrates in quartz substrate part 15. Therefore, if it is desired to obtain a linearly polarized light according to a characteristic of the photo-alignment, the quartz substrate part is formed by using layers of quartz substrate having over a specific number of quartz substrates. And, to obtain a partially polarized light, the quartz substrate part is formed of one or any appropriate number of quartz substrates.

Furthermore, since the large scale polarizer consistent with the present invention, as compared with the conventional polarizer, does not select an absorption mode, it should be possible to use semi-permanently, its endurance is good, and there is no dependence of wavelength.

As shown in FIG. 4B, as to large scale polarizer 10, the illuminance of the light transmitted by the large scale polarizer is uneven according to the position on alignment layer 50 caused by polarizer holder 13. That is, the illuminance is relatively high in the middle of quartz substrate part 15; the illuminance is low near polarizer holder 13; and the incident light is not transmitted directly underneath polarizer holder 13.

FIG. 5A shows a polarizer system employing large scale polarizer 10 shown in FIG. 4A.

A light from a lamp 7 is reflected by a cold mirror 61 onto a small scale polarizer 20, focused by a fly eye lens (homogenizer) 31, and transmitted by another small scale polarizer 40. The light is reflected again by a reflective mirror 63 onto a collimation lens 30, the light recollimated and focused becomes an unpolarized parallel light. The unpolarized parallel light is incident at the Brewster's angle $\theta_B$ on the quartz substrate part of large scale polarizer 10. A part of the light is reflected, while another part of the light is transmitted and irradiated over an alignment layer 50 on a substrate 70 supported on a stage 75 after passing through a mask 80. Moreover, the polarizer system further comprises a first movement control part 90a that moves the large scale polarizer in the X axis direction and a second movement control part 90b that moves the large scale polarizer in the Y axis direction in FIG. 4A during the photo-alignment stage. Although only one configuration and one set of components are described hereinabove (such as cold mirror and fly eye lens), many other configurations and components may be substituted, as needed.

To obtain the uniformity of the illuminance of the light irradiated on alignment layer 50, it is preferable to place that large scale polarizer 10 is placed having a specific interval from alignment layer 50. This is because the polarizer holder makes the illuminance of the light reaching the alignment layer uneven depending on the position as shown in FIG. 4B.

Figure 5B:
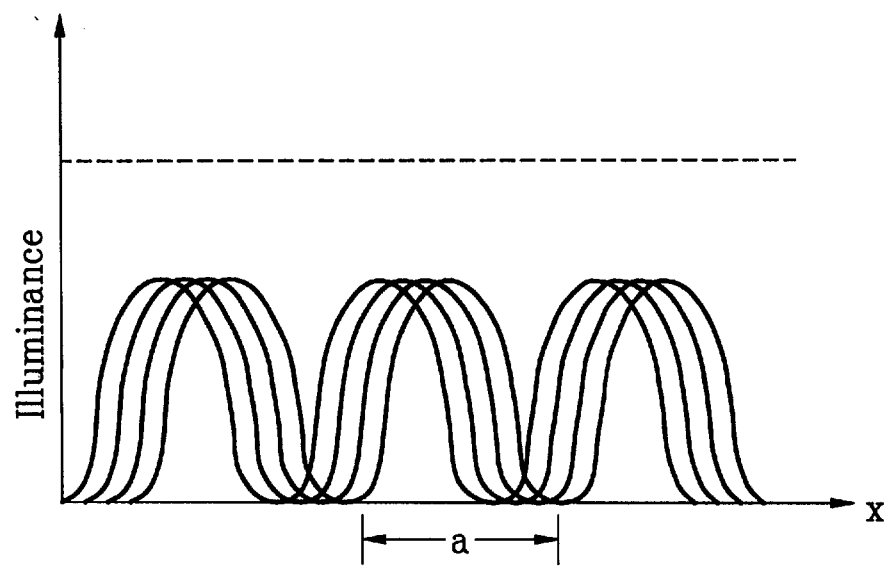
FIG. 5B is a graph showing polarization characteristics of the polarizer system shown in FIG. 5A.

FIG. 5B is a graph showing polarization characteristics of the polarizer system shown in the FIG. 5A.

When the first movement control part 90a makes the large scale polarizer 10 move in a specific direction (for example, along the X axis in FIG. 4A) at a specific distance during the photo-alignment stage, as shown in FIG. 5B, the illuminance of alignment layer 50 is made uniform in the whole position along the X axis. In FIG. 5B, the curved line represents an illuminance at a specific point during the photo-alignment process, and the dotted line represents an average illuminance over the whole photo-alignment process. Label a is a distance between the adjacent polarizer holders on the X axis.

Therefore, in connection with performing the photo-alignment process using the polarizer system employing the large scale polarizer, when the distance between the adjacent polarizer holders along the X axis is a, first movement control part 90a oscillates large scale polarizer 10 for a distance of $a \pm \delta (\delta << a)$ one or more times along the X axis during the photo-alignment stage. In the same manner, when the distance between the adjacent polarizer holders along the Y axis is b, second moving control part 90b oscillates large scale polarizer 10 to move in one way for a distance of $b \pm \delta$ ($\delta << b$) one or more times along the Y axis during the photo-alignment stage.

Accordingly, when the large scale polarizer moves in the manner described above, the uneven illuminance shown in FIG. 4B is made uniform.

Although FIG. 5B shows only the sectional view taken along the X axis of FIG. 4A, the same results are observed in the sectional view taken along the Y axis.

Figure 6:
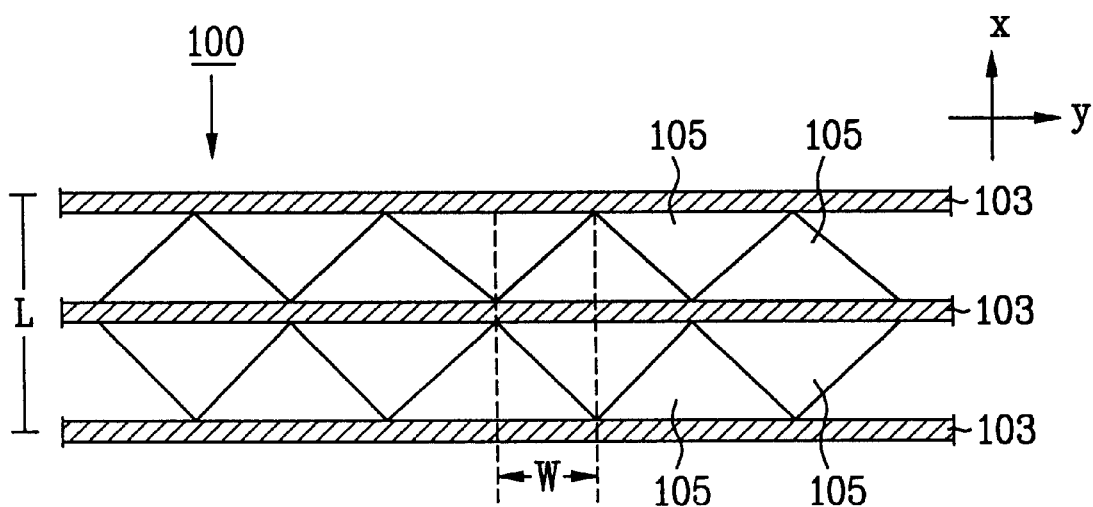
FIG. 6 is a plan view of a large scale polarizer according to another embodiment of the present invention.

FIG. 6 is a plan view of a large scale polarizer according to another embodiment of the present invention.

In FIG. 6, a large scale polarizer 100 comprises one or more quartz substrate parts 105 formed as a triangle, and a polarizer holder 103 supporting quartz substrate part 105. Quartz substrate part 105 comprises one or more layers of quartz substrate, and the quartz substrate parts are linked in one direction.

With the above triangular configuration, large scale polarizer 100 obtains a uniform illuminance by scanning only along the X axis. For example, although it scans in lengths of L along the X axis, the whole area irradiated is given equally the effects of the boundary line between the quartz substrate parts (an area of width of W in the figure), and the non-irradiated area by the polarizer holder is covered evenly.

Figure 7:
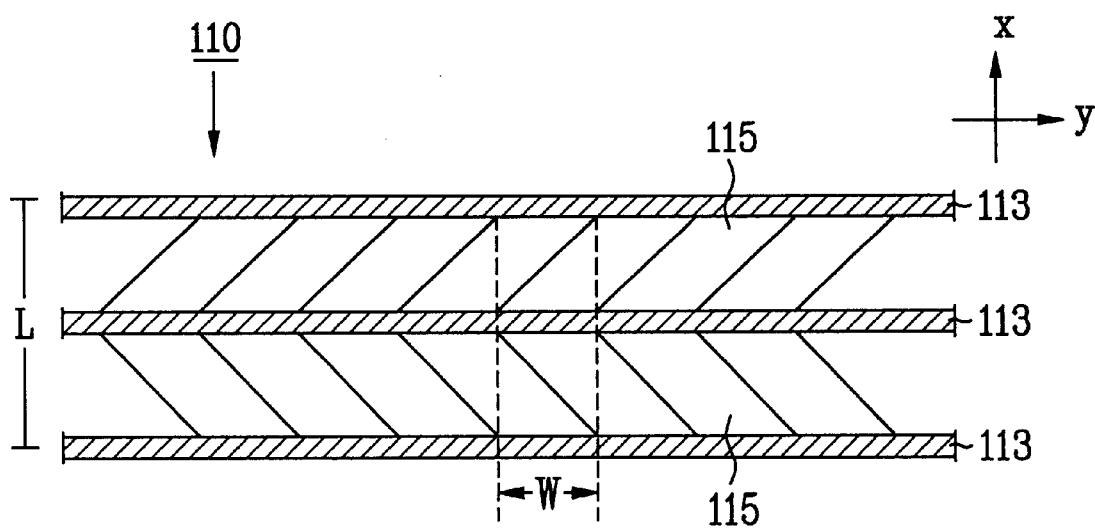
FIG. 7 is a plan view of a large scale polarizer according to a further embodiment of the present invention.

FIG. 7 is a plan view of a large scale polarizer according to another embodiment of the present invention.

A large scale polarizer 110 comprises one or more quartz substrate parts 115 formed in a parallelogram configuration, and a polarizer holder 113 supporting quartz substrate part 115. Quartz substrate part 115 comprises one or more layers of quartz substrate, and the quartz substrate parts are linked in one direction.

With the above parallelogram configuration, large scale polarizer 110 obtains a uniform illuminance by moving only along the X axis. For example, although it scans in lengths of L along the X axis, the whole area irradiated is given equally the effects of the boundary line between the quartz substrate parts (an area of width of W in the figure), and the non-irradiated area by the polarizer holder is covered evenly. Moreover, compared with quartz substrate part 105 in FIG. 6, this quartz substrate parts 115 of the parallelogram are assembled more easily.

Figure 8:
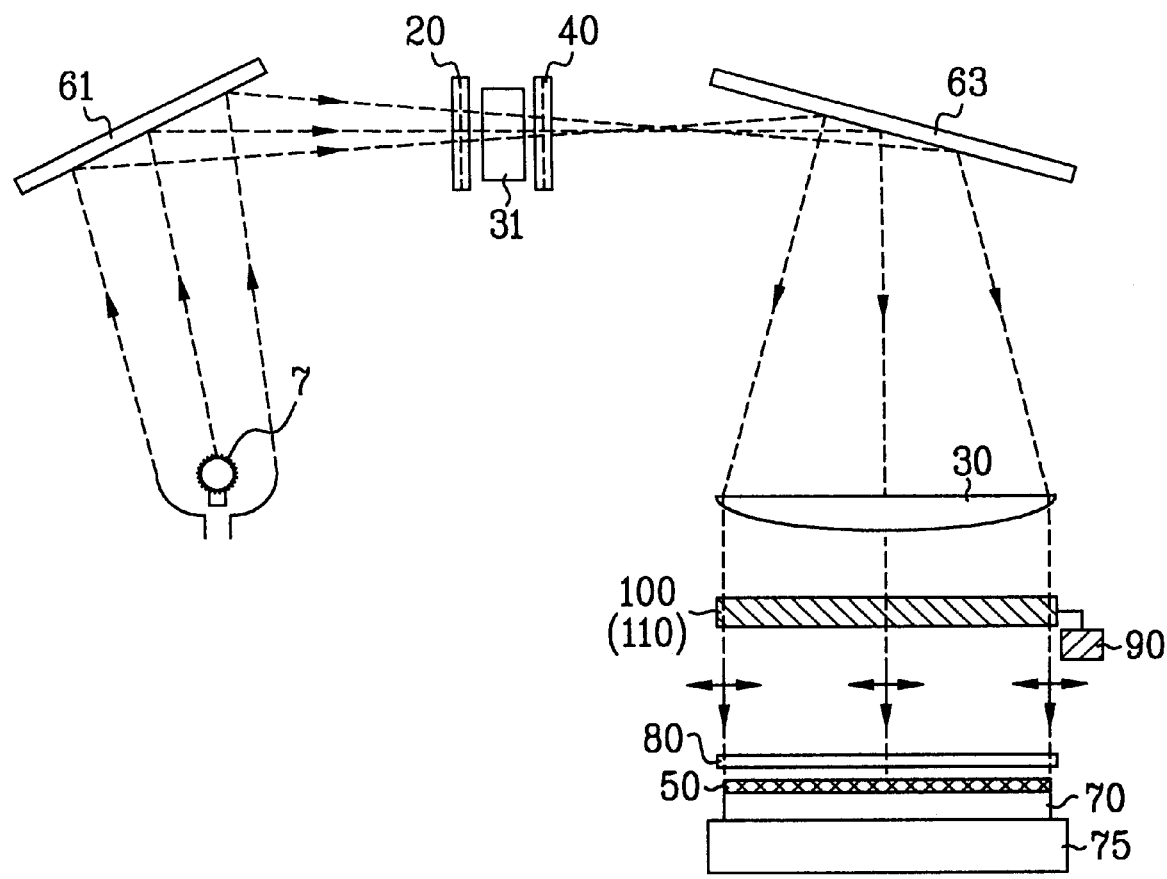
FIG. 8 shows a polarizer system employing the large scale polarizer shown in FIG. 6 or 7.

FIG. 8 shows a polarizer system employing the large scale polarizer shown in FIG. 6 or 7.

A light from a lamp 7 is reflected by a cold mirror 61 onto a small scale polarizer 20, focused by a fly eye lens (homogenizer) 31, and transmitted through another small scale polarizer 40. The light is reflected again by a reflective mirror 63 onto a collimation lens 30, the light recollimated and focused becomes an unpolarized parallel light. The unpolarized parallel light is incident at the Brewster's angle $\theta_B$ on the quartz substrate part of large scale polarizer 100 (or 110) (see the FIGS. 6 and 7). And a part of the light is reflected, and another part of the light is transmitted and irradiated over an alignment layer 50 on a substrate 70 supported on a stage 75 after passing through a mask 80. And, a movement control part 90 is connected with and moves the large scale polarizer.

A part of the light is reflected, and another part of the light is transmitted and irradiated over alignment layer 50. Movement control part 90 makes the large scale polarizer move in the X axis direction during the irradiation of the photo-alignment layer (refer to FIGS. 6 and 7).

In the above polarizer system of FIG. 6 or 7, because the structure of the quartz substrate used is a triangle or a parallelogram, a uniform illuminance could be obtained by moving in only one direction along either the X or Y direction, the direction being perpendicular to the polarizer holder. Therefore, one-directional movement reduces the number of processes, and as a result, the number of the movement control parts needed is fewer, which reduces the cost of manufacture.

Moreover, although the polarizer systems shown in FIGS. 5A and 8 have one large scale polarizer and two small scale polarizers in front and rear of the fly eye lens, it is possible to use one, two or all of them depending on the situation. The number and position of the polarizers are flexible. For example, in the case of using one polarizer, the polarizer may be placed at 10(100), 20 or 40 in FIGS. 5A and 8. In the case of using two polarizers, the polarizers may be placed at 10(100) and 20, 20 and 40, or 10(100) and 40 in FIGS. 5A and 8. When three polarizers are used, polarizers may be placed at 10(100), 20 and 40 in FIGS. 5A and 8.

It is further understood by those skilled in the art that the foregoing description is a preferred embodiment of the disclosed device and that various changes and modifications may be made in the invention without departing from the spirit and scope thereof.

It will be apparent to those skilled in the art that various modifications and variations can be made in the polarizer and polarizer system of the present invention and in construction thereof without departing from the scope or spirit of the invention. As an example, while the embodiments discussed above place the polarizer at the Brewster's angle, it need not be at the Brewster's angle. Moreover, the movement of the polarizer is not limited to the particular X and Y directions described above—it may be moved in any fashion as long as the alignment layer is uniformly irradiated, as needed.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polarizer comprising:
   a plurality of quartz substrate parts, each quartz substrate part including one or more quartz substrates; and
   a polarizer holder supporting said plurality of quartz substrate parts, wherein the polarizer holder has a lattice-like structure.

2. A polarizer system comprising:
   a light source for generating a light;
   a plurality of quartz substrate parts, each quartz substrate part including one or more quartz substrates;
   a polarizer holder supporting said plurality of quartz substrate parts; and
   means for directing said light onto said plurality of quartz substrate parts, wherein the polarizer holder has a lattice-like structure.

3. A polarizer system, comprising:
   a light source for generating a light;
   a plurality of quartz substrate parts, each quartz substrate part having one or more quartz substrates;
   a polarizer holder supporting said plurality of quartz substrate parts;
   means for directing said light onto said plurality of quartz substrate parts;
   a movement control part coupled to and moving the polarizer holder to uniformly irradiate an area underneath said plurality of quartz substrate parts and said polarizer holder.

4. The polarizer system according to claim 3, wherein the movement control part includes means for oscillating the polarizer holder.

5. The polarizer system according to claim 3, wherein the movement control part includes:
   a first movement control part moving the polarizer holder in a first direction parallel to the surface of the polarizer holder; and
   a second moving control part movement the large scale polarizer in a second direction parallel to the surface of the polarizer holder and perpendicular to the first direction.

6. A polarizer system, comprising:
   a light source for generating a light;
   a lens including a fly eye lens;
   at least a first polarizer including a quartz substrate adjacent the lens, the first polarizer being positioned between the fly eye lens and the light source; and
   a support member supporting an alignment layer, the polarizer being positioned between the light source and the support member.

7. The polarizer system according to claim 6, further comprising a second polarizer, the lens being positioned between the first and second polarizers.

8. The polarizer system according to claim 7, further comprising a second lens and a third polarizer, the second lens and the third polarizer being positioned between the second polarizer and the support member, respectively.

9. The polarizer system according to claim 8, wherein the second lens includes a collimating lens.

10. The polarizer system according to claim 8, the third polarizer includes a quartz substrate.

11. The polarizer system according to claim 8, the third polarizer includes a plurality of quartz substrates.

12. The polarizer system according to claim 7, the second polarizer includes a quartz substrate.

13. The polarizer system according to claim 7, the second polarizer includes a plurality of quartz substrates.

14. The polarizer system according to claim 6, wherein the lens includes a collimating lens and the collimating lens being positioned between the first polarizer and the light source.

15. The polarizer system according to claim 14, further comprising a second polarizer and a second lens, the second polarizer and the second lens being positioned between the light source and the first polarizer.

16. A polarizer system comprising
   a polarizer system, comprising:
      a light source for generating a light;
      a lens;
      at least a first polarizer including a quartz substrate adjacent the lens; and
      a support member supporting an alignment layer, the polarizer being positioned between the light source and the support member,
   wherein the lens includes a fly eye lens positioned between the first polarizer and the light source.

17. The polarizer system according to claim 16, further comprising a second lens and a second polarizer, the second lens and the second polarizer being positioned between the first polarizer and the support member, respectively.

18. A method of forming a liquid crystal display device having first and second substrates comprising:
   forming a photo-alignment layer on the first substrate;
   irradiating the photo-alignment layer with a ultraviolet light through a polarizer system including a quartz substrate unit; and
   forming a liquid crystal layer between the first and second substrates,
   wherein the polarizer system includes:
      an ultraviolet light source;
      a first lens unit adjacent the light source; and
      a second lens unit adjacent the first lens unit.

19. The method according to claim 18, wherein the quartz substrate unit includes a plurality of substrates.

20. The method according to claim 19, wherein the plurality of quartz substrates has a size corresponding to a liquid crystal display panel.

21. The method according to claim 18, wherein the polarizer system further includes:
   a first mirror adjacent the light source; and
   a second mirror adjacent the first lens.

22. The method according to claim 18, wherein the first lens unit includes a lens and a polarizer.

23. The method according to claim 22, wherein the first lens unit further includes a second polarizer.

24. The method according to claim 18, wherein the step of irradiating the photo-alignment layer includes directing the collimated light to the photo-alignment layer through a polarizer.

25. A method of forming a liquid crystal display device having first and second susbtrates comprising:
   forming a photo-alignment layer on the first substrate;
   irradiating the photo-alignment layer with ultraviolet light through a polarizer system including a first polarizer and a first lens unit; and forming a liquid crystal layer between the first and second substrates, wherein the polarizer system further includes:
   an ultraviolet light source;
   a second lens unit receiving light from the first polarizer and first lens unit; and
   a second polarizer receiving light from the second lens unit.

26. The method according to claim 25, wherein the first polarizer partially polarizes the ultraviolet light.

27. The method according to claim 25, wherein the second polarizer partially polarizes the ultraviolet light.

* * * * *